Aug. 9, 1960     K. W. MAIER     2,948,526

BUFFER DEVICE

Filed May 1, 1958

INVENTOR.

KARL W. MAIER

United States Patent Office 2,948,526
Patented Aug. 9, 1960

2,948,526

BUFFER DEVICE

Karl W. Maier, Cheshire, Conn., assignor to Olin Mathieson Chemical Corporation, a corporation of Virginia Filed May 1, 1958, Ser. No. 732,299

5 Claims. (Cl. 267—1)

The present invention relates to spring mechanisms and relates in particular to such mechanisms which fall into the broad class of devices known as ring springs.

In general, ring springs comprise a plurality of metal rings stacked in a series and in a staggered or alternating fashion so that the internal surface of one ring of a given pair is formed with a taper while a mating ring is formed with an external taper so that one ring is partially received within the other in a telescoping fashion with the tapered surfaces in sliding contact with one another.

In effect, a wedge action is achieved when the outer spring is pressed down upon the inner spring causing the mating tapered surfaces to tend to slide by one another.

The wedge action, of course, tends to expand the outer ring to place it under a hoop stress or under a tensive stress while the inner ring is stressed radially inward in compression.

A spring effect is achieved when a load is applied to a stack of rings in a direction which tends to drive one ring of each pair into its mating ring in telescoping fashion. For example, when pairs of rings are stacked, a load applied along the longitudinal axis of the stack is effective to compress the stack slightly. Correspondingly, release of the load allows the ring stack to expand; both the expansion and contraction occurring along the longitudinal axis of the stack.

This axial deflection (the expansion and contraction) occurs as a result of the corresponding radial expansion and radial contraction which occurs in each pair of rings developed by the wedge action described above.

One well-known characteristic of ring springs is their capability of storing large amounts of energy in limited volumes. Also, ring springs have a high damping rate, converting 50% or more of the absorbed energy into heat as a result of the friction effect occurring between the telescoping rings.

Although ring springs are effective to bear exceedingly high loads, their utility has been limited by their inherent stiffness or lack of axial flexibility. By the term "axial flexibility" is meant the degree of deflection or change in stack height that occurs as a load is applied to and removed from a given stack of ring springs.

In order to obtain an appreciable deflection or stroke along the stack axis in prior art devices, a great number of rings must be stacked to cumbersome heights. Frequently space limitations preclude the stacking of rings to the height necessary to produce the desired deflection.

This low flexibility or low deflection characteristic of prior art ring springs stems from the inherent stiffness of the materials, such as steel, from which the rings are fabricated.

Furthermore, the excessive weight of ring springs has also limited their usefulness.

Accordingly, it is a particular feature of the present invention to provide a novel spring structure in the broad class of springs known as ring springs which overcomes the above-noted disadvantages.

Another feature of the invention is the provision of a spring structure in the above class having an exceedingly high ratio of energy absorbing capacity to spring weight expressed as $E/W$, where E represents the energy absorbing capacity of the spring expressed in foot-pounds while W represents the weight of the spring in pounds. It is contemplated that the ratio of $E/W$ be as high as 4,000 foot-pounds per pound.

Another feature of the invention is the provision of a ring spring device where the basic structural elements are non-metallic but whose energy absorbing capacity and flexibility are far greater than an all-metallic ring spring.

A still further feature of the invention is the provision of a ring spring device which is simple in structure, economical to manufacture and of uncomplicated design.

A ring spring or a buffer device embracing certain principles of the present invention may comprise at least one assembly, including a first ring and a second ring, said first ring being formed with an internal taper and said second ring being formed with a mating taper so that the first ring is operative to receive part of the second ring in telescoping fashion, said first ring being fabricated compositely of high tensile strength fibers and a plastic binder, said composite ring having a hoop strength in excess of 250,000 p.s.i. and at least one metallic liner disposed between the first ring and the second ring operative to provide a sliding surface for said tapers.

Other features and advantages of the present invention will become more apparent from the succeeding specification when read in conjunction with the appended drawings in which.

Figure 2:
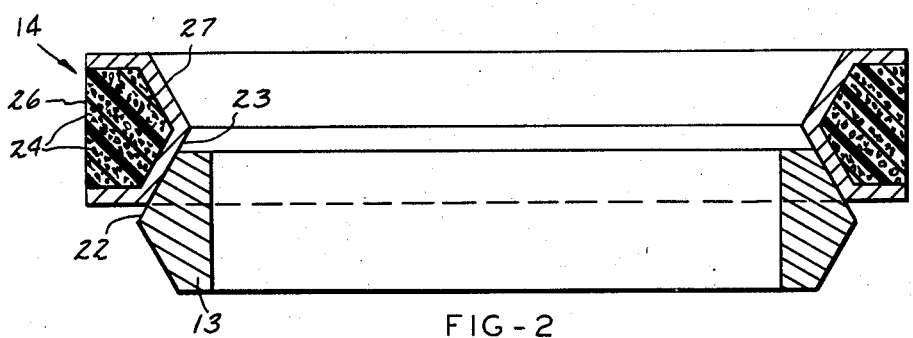
Fig. 2 is a sectional view of a pair of springs of the type illustrated in Fig. 1, somewhat enlarged.

Before proceeding further with the detailed description of the invention, it is noted that the inner element, ring, or disc, as the case may be, can be referred to as the compression element while the external ring may be referred to as the tension element.

Furthermore, although certain preferred structural materials will be described and discussed in connection with the description of the exemplary embodiment of the invention, it is not intended that the present disclosure be limited to the materials disclosed. However, it is intended that the outer ring of each pair of springs be fabricated of a fibrous material, suitably bonded, which will withstand a hoop stress in excess of 250,000 p.s.i. without exceeding the elastic limit of the fibre.

It is intended that the strength element of the outer ring be filaments or ends of fibers wound in toroidal fashion and suitably bonded together with a plastic material. An especially well suited fibre or filament is glass fibre having an elongation of at least 2%.

In contrast, the basic function of the interior ring or compression element is that it be capable of withstanding compressive loads in excess of 250,000 p.s.i. while having some resilience.

Where weight considerations are only moderately important the inner ring may be fabricated of metal; however, in applications where a low ratio of weight of the unit to capacity of the spring is paramount, it is desirable to fabricate the inner spring of a semi-rigid plastic material, such as hard rubber, in a disc or ring form.

For purposes of generating optimum frictional surfaces and for conveniently packaging the various elements, it is frequently desirable to enclose one or both of the elements of each pair of elements within a metallic liner characterizing a split or gapped ring.

The reason for the gap in the liner is to permit the liner to breathe or follow the expansion and contraction of fiber-glass while considerable stresses and strains are being applied to the tension and compression elements. Stated otherwise, when a load is applied to the tension element of the ring spring the gap in the split liner increases as the ring expands while when the compressive stress is applied to the compression element the gap in its liner (if a liner is used) tends to close as the element is compressed. Thus, there is no danger of overstressing the liner.

Referring now to the drawings, there is shown a ring spring assembly embracing the present invention comprising a housing 10 having a removable base 11 and a piston or load transmitting element 12. The housing 10 is generally cylindrical and within the interior of the housing there is disposed a stack of rings arranged generally coaxial with the longitudinal axis of the housing. The stack of rings consists of a plurality of compression or inner ring elements 13 and a corresponding group of outer or tension ring elements 14 where the rings contact one another along mating tapered surfaces as at 16. The top ring of the stack supports a ring 17 in turn carrying a base plate 18. Disposed between the plate 18 and the number 12 is a coil spring 19 under sufficient compressive stress so as to tend to hold the element 12 in the position shown with the cooperating shoulder of piston 12 and the housing 10 in contact with one another as shown at 21.

Correspondingly, the stress of the spring 19 tends to maintain the stack of elements 13 and 14 in a snug relationship insuring a real contact along their mating tapers.

The structure of the elements 13 and 14 is more apparent in Fig. 2 where an enlarged view of a pair of rings comprising a compression element 13 and a tension element 14 are shown formed with mating tapers 22 and 23 respectively. The element 13 is fabricated of a metal, such as steel, while the element 14 is fabricated of a plurality of toroidally wound fiberglass filaments 24 bonded into a package by a suitable plastic or resin 26.

A metal liner or split ring 27 partially surrounds the winding of fiberglass filaments and provides the sliding surface or taper 23 against which the mating taper 22 may operate.

It would not be practical to use a glass reinforced plastic material without a liner 27 as a bearing surface.

Figure 4:
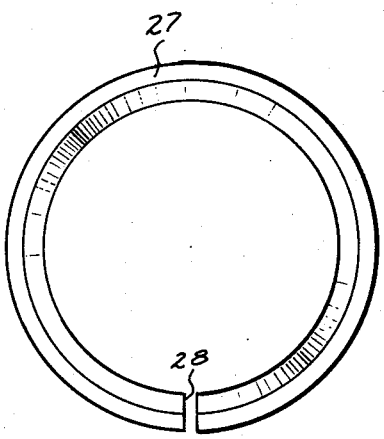
Fig. 4 is a plan view of a typical metallic liner used to encircle or house one or both of the rings of each pair of rings; and, Fig. 5 is a showing of the point of contact of a pair of ring springs where both the inner and outer rings are constructed with metal liners.
Figure 1:
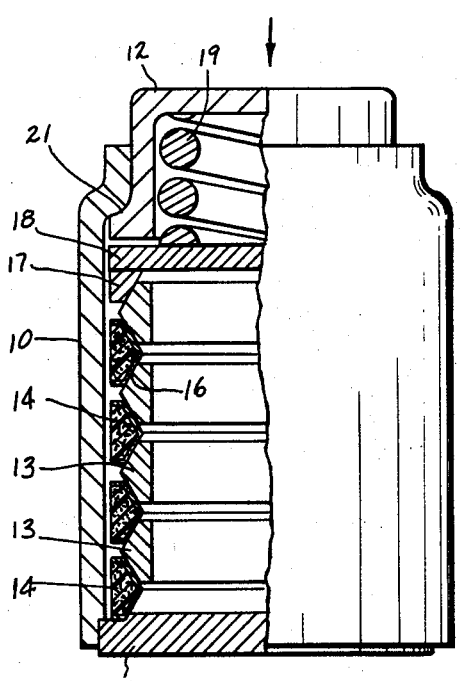
Fig. 1 is a showing of a typical buffer mechanism embracing the principles of the present invention.

As shown in Fig. 4, the liner 27 is split and is formed with a gap 28 so that the element may breathe or expand and contract while the stresses and strains are developed in the ring elements.

Figure 3:
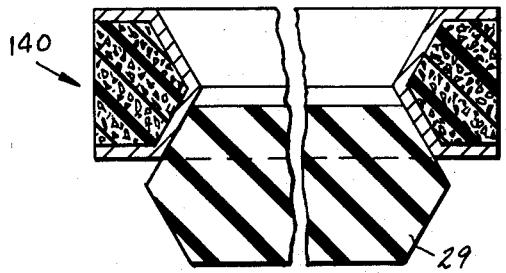
Fig. 3 is a showing similar to Fig. 2 wherein the inner or compression element is a disc shown fabricated of a plastic or other mildly resilient hard, rubber-like material having high resistance to a compressive load.

Fig. 3 shows another embodiment of the invention wherein the inner or compressive element of a pair of rings is shown fabricated in the form of a semi-rigid plastic material defining a solid hard rubber disc 29.

The tensile element is substantially the same as the corresponding element shown in Fig. 2.

Figure 5:
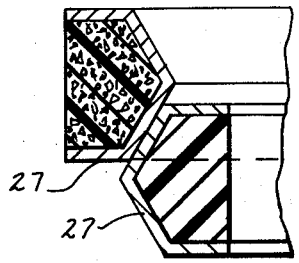

In Fig. 5 there is a showing of a still further embodiment of the invention wherein both the tensile and the compressive elements of the spring are fabricated with a liner or gap ring 27, the tensile element being formed in the manner described in the discussion of Fig. 2 while the compression element is fabricated in the form of a ring of semi-rigid plastic or ceramic material having a high resistance to a compressive load.

It is intended that the embodiment of Fig. 3 may be provided with an additional metal liner 27 surrounding the element 29 as frictional characteristics may require.

In operation of the ring spring of the present invention a compressive load applied to the head of the piston element 12 is directly transmitted to the plate 18 thence to the ring 17 and thereafter to the stack of rings 13 and 14. As the load is applied in the direction shown by the arrow, components of force are developed which tend to compress the inner elements 13 inwardly while the outer or tension elements are placed under a hoop stress. Obviously, when the buffer device or ring spring is receiving a compressive load, frictional forces are developed between the rings directed generally along the same path as that of the load. When the load is removed, the frictional forces are reversed and, as a result, an exceedingly high damping effect is achieved.

It is to be understood that the basic structural material from which the tensile element is fabricated is intended to be non-metallic. In general, the tensile element is fabricated by winding ends of filaments or ropes of fibers in toroidal or doughnut fashion suitably bonded by plastic or resin material into a composite mass. The tensile strength of the composite tension element is intended to be substantially in excess of 250,000 p.s.i. with an elongation of at least 3%.

Although it is desirable to fabricate the compression member of non-metallic material for maxium flexibility, it is within the spirit and scope of the invention to fabricate the compression member of metallic material.

It is anticipated that a wide variety of arrangements may be devised without departing from the spirit and scope of the present invention.

What is claimed is:

1. A ring spring buffer device of the type characterized by a plurality of cooperating pairs of rings wherein the inner surface of a first ring is formed with a taper mating with and contacting a corresponding taper formed on the outer surface of a second ring, said rings being adapted to engage one another along said mating tapers whenever an axial load is applied which tends to drive one ring into the other in telescoping fashion, the improvement which comprises a first ring fabricated of toroidally wound fibers bonded together by a suitable plastic material to form a composite structure, a second ring defining a disc of plastic material and a split metal liner disposed between the first and second rings.

2. The device of claim 1 wherein the first ring and the second ring are each provided with metallic liners in the area of their mating tapers to provide bearing surfaces.

3. The device of claim 1 wherein the fibers are fabricated of glass and when combined with said plastic binder the composite unit is operative to develop a hoop strength in excess of 250,000 p.s.i. with an elongation of about 3 percent while the disc has a compressive strength in excess of 250,000 p.s.i.

4. The device of claim 1 wherein the ratio of $E/W$ is of the order of 4,000 foot-pounds per pound where E represents energy storing capacity expressed in foot-pounds and W represents weight of the spring in pounds.

5. A buffer device comprising at least one assembly including a pair of rings, one ring being formed with an internal taper and the other being formed with a mating taper so that said one ring is operative to receive part of the other in telescoping fashion, said one ring being fabricated compositely of glass fibers suitably bonded together by a plastic material and having a hoop strength in excess of 250,000 p.s.i. and a metallic liner disposed between the rings, said other ring having a compression strength of at least 250,000 p.s.i.

References Cited in the file of this patent

UNITED STATES PATENTS 2,852,424   Reinhart et al. _____ Sept. 16, 1958

FOREIGN PATENTS

| | | |
|---|---|---|
| 142,128 | Australia | July 10, 1951 |
| 767,090 | Germany | June 9, 1952 |
| 1,085,331 | France | July 21, 1954 |
| 1,087,743 | France | Aug. 25, 1954 |